United States Patent Office 3,440,216
Patented Apr. 22, 1969

3,440,216
PROCESS FOR CURING AN EPOXY RESIN WITH AN ORGANIC ANHYDRIDE AND PYRIDINE ACTIVATOR AND COMPOSITION THEREOF
George S. Wooster, Hamburg, and Aloysius J. Kane, Buffalo, N.Y., assignors to Allied Chemical Corporation, New York N.Y., a corporation of New York
No Drawing. Filed Oct. 20, 1965, Ser. No. 499,066
Int. Cl. C08g 30/00; C09d 3/48; D04h 1/32
U.S. Cl. 260—47                                11 Claims

ABSTRACT OF THE DISCLOSURE

A process for curing and resinifying polyepoxides, preferably glycidyl polyethers of polyhydric phenols, which comprises mixing and reacting the polyepoxide with a carboxylic acid anhydride or mixture of anhydrides in the presence of an activator for the anhydride or mixture of anhydrides, comprising certain dialkylpyridines. This invention further provides cured compositions obtained by the above-described process which are characterized by their excellent hardness and durability.

---

Polyepoxides and glycidyl polyethers of polyhydric phenols and polyhydric alcohols, otherwise known and hereafter referred to as "epoxy resins," are condensation products of organic epoxides with polyhydric phenols and polyhydric alcohols containing the 1,2-epoxy or oxirane linkage. They may be cured to form strong products of high molecular weight, by reaction with curing agents such as amines and organic acid anhydrides, and are widely employed as structural plastics, adhesives, molding resins, films and the like because of their high strength, resistance to chemicals, and strong adhesion properties.

It is known that carboxylic acid anhydrides are useful for curing epoxy resins. It is known also that when carboxylic acid anhydrides are used alone for curing epoxy resin, the resin mixtures have certain undesirable properties, for example, they require long cure cycles and produce soft polymers. These shortcomings have been partially overcome by the addition to such anhydrides or to mixtures of such anhydrides and the epoxy resin to be cured, of activators or accelerators, to reduce the cure time and lower the temperature needed to cause resinification and hardening of the epoxy resin. The results obtained heretofore, however, have not been entirely satisfactory. It has been found for example, that the accelerating effect of some activators is manifested only at high temperature, which prevents their use in preparations designed to be cured at or near room temperatures, or in preparations to which high temperatures are injurious. Other activators which are effective at or near room temperatures produce cured resins which are sometimes deficient, particularly as to hardness and durability.

It therefore an object of this invention to provide a novel method for curing epoxy resins. It is a further object to provide a novel process for curing epoxy resins using an acid anhydride or a mixture of acid anhydrides and a novel class of activators for the curing composition. It is a further object of this invention to provide improvements in the process for curing epoxy resins at or near room temperature. It is a further object of this invention to provide a novel process for curing epoxy resins, at a rapid rate at elevated temperatures. It is still another object of this invention to provide a process for curing epoxy resins, which gives cured products having excellent hardness and durability. These and other objects of the invention will become apparent from the following description thereof.

We have now discovered that improvements in the process of curing epoxy resins are obtained by the process of our invention which comprises mixing and reacting the epoxy resin to be cured with a carboxylic acid anhydride and an activator for the anhydride comprising a dialkylpyridine which is a member of the group consisting of 2,4-dialkylpyridines, 2,5-dialkylpyridines, 3,4-dialkylpyridines and 3,5-dialkylpyridines. We have discovered that when a carboxylic acid anhydride is used in combination with the above-noted dialkylpyridine activators, they display surprisingly high activity as curing agents for epoxy resins, such that curing of epoxy resins can be performed at low temperatures, below about 100° C., in a relatively short period of time. For example, a combination of an epoxy resin, a carboxylic acid anhydride and 2,4-dimethylpyridine activator, gives excellent cures at about room temperature, that is at about 25° C., and does so in a period of about two days without the liberation of excessive amounts of heat. Our new combinations are thus well-suited for use in the manufacture of low temperature cures such as surface coatings, moldings, castings and the like where a low exotherm is desirable. At higher temperatures, for example at about 80° C., our combination gives a rapid rate of cure, generally about an hour or less and is particularly applicable in the preparation of rapid cure high temperature enamels, such as may be used on assembly lines. An additional advantage derives from the fact that the products obtained by the use of the dialkylpyridine activators possess excellent hardness and durability.

Acid anhydride curing agents useful in the process of our invention are well-known in this art and may be any anhydride derived from a polycarboxylic acid and which possesses at least one anhydride group. The carboxylic acid anhydrides may be of the saturated, unsaturated, aliphatic, cycloaliphatic, aromatic or heterocyclic type. Examples of these anhydrides include, but are not limited to, phthalic acid anhydride, isophthalic acid anhydride, di-, tetra- and hexahydrophthalic acid anhydrides, 3,4,5, 6,7,7-hexachloro-3,6-endomethylene 1,2,3,6 - tetrahydrophthalic acid anhydride ("chlorendic anhydride"), succinic anhydride, maleic anhydride, monochloromaleic anhydride, 6-ethyl-4-cyclohexene-1,2-dicarboxylic acid anhydride, 3,6-dimethyl-4-cyclohexene-1,2-dicarboxylic acid anhydride, 6-butyl-3,5-cyclohexadiene - 1,2 - dicarboxylic acid anhydride, octadecylsuccinic anhydride, dodecylsuccinic anhydride, dioctylsuccinic anhydride, nonadecadienylsuccinic anhydride, 3 - methoxy - 1,2,3,6 - tetrahydrophthalic acid anhydride, 3-butoxy-1,2,3,6-tetrahydrophthalic acid anhydride, pyromellitic acid anhydride, di-, tetra and hexahydropyromellitic acid anhydride, polyadipic acid anhydride, polysebacic acid anhydride, bicyclo-[2,2,1]hept-5-ene-2,3-dicarboxylic acid anhydride, methylbicyclo[2,2,1]hept-5-ene-2,3-dicarboxylic acid anhydride, and the like and mixtures thereof.

Cyclic anhydrides especially preferred in the practice of the present invention are phthalic, tetrahydrophthalic, dihydrophthalic, dodecenylsuccinic and methylbicyclo-[2,2,1]hept-5-ene-2,3-dicarboxylic acid anhydrides and mixtures thereof.

The activator for the anhydrides is selected from a group comprising 2,4-dialkylpridines, 2,5-dialkylpyridines, 3,4-dialky-pyridines and 3,5-dialkylpyridines. The alkyl substituents may be straight or branched, substituted or unsubstituted as well as cycloaliphatic in nature. Examples of such dialkylpyridines include, but are not limited to 2,4-lutidine, 2,4-diethylpyridine, 2,4-di($\beta$-chloroethyl) pyridine, 2-dicyclohexylpyridine, 2,5-lutidine, 2,5-diisopropylpyridine, 2,5-dioctylpyridine, 3,4-lutidine, 3,4-diisobutylpyridine, 3-methyl-4-ethylpyridine, 3,5-lutidine, 3,5-dinonylpyridine and the like and mixtures thereof. The preferred dialkylpyridines are those in which each of the alkyl substituents contains from one to four carbon atoms. Especially preferred are the lutidines because of the ready availability and general effectiveness. Surprisingly 2,6-dialkylpyridines which are isomeric with the above indicated activators are extremely poor activators for anhydride-epoxy resin systems. For example, when a sample of a commercial ethoxylene resin ("Epon Resin 828") is cured with 70% of its weight of hexahydrophthalic anhydride in the presence of about 2.5 parts per hundred parts resin of 2,4-lutidine for one hour at 80° C., a hard durable resin is obtained. However when an identical sample of resin is similarly cured, using 2,6-lutidine as the activator instead of 2,4-lutidine, the resin does not harden at all: only a viscous liquid is obtained.

The dialkylpyridine activators of our invention are more efficient than known activators for epoxy resin-anhydride curing systems. For example while a dialkylpyridine activator of our invention promotes curing of a commercial epoxy resin (Epon Resin 828)-hexahydrophthalic anhydride combination in about 3 days at room temperature, the same epoxy resin-anhydride combination requires a cure period of about 7 days with a commercially available epoxy resin-anhydride curing activator, 2-ethyl-4-methylimidazole.

According to the process of our invention, the epoxy resin is cured by admixing and reacting with the above described anhydrides and activators. The type and amount of anhydride to be used in the process will vary over a wide range, depending upon the particular epoxy resin being cured and upon the properties desired in the cured resin. For most epoxy resins, satisfactory cures are obtained by reacting the epoxy resin with from 10 to 200% by weight of the epoxy resin, of the anhydride. For best results, the amount of anhydride used should be from about 30% to about 150% by weight of the epoxy resin, depending upon the nature of the anhydride and the epoxy resin used.

The dialkypyridine activators noted above are needed only in comparatively small amounts. For example satisfactory results are obtained when the amine is used in amounts varying from about 0.2% to about 15% by weight of the epoxy resin. Quantities of activator of between about 1.0% to about 5% by weight, based on the epoxy resin, give excellent results.

In carrying out the process of our invention, the anhydride and dialkylpyridine activator may be combined together before they are added to the epoxy resin or they may be added separately thereto.

It is usually desirable to have the epoxy resin in mobile liquid form when the anhydrides and activator are added, in order to facilitate thorough blending of the components. With those epoxy resins that are liquid, but too viscous for ready mixing, the epoxy resin may be heated or an inert solvent may be added to provide the desired fluidity.

The cures according to the process of our invention may be effected over a wide range of temperatures. As already indicated, the above-described epoxy resin-anhydride-dialkylpyridine combinations may be cured at low temperatures, for example, near room temperature, or about 25° C. to effect a slow cure in several days. Alternately the cure may be accomplished by blending the anhydride and dialkylpyridine activator with the epoxy resin and raising the temperature of the blend to higher temperatures, for example, to about 80° C. to effect a cure in about one hour. Faster rates of cure are obtained by raising the cure temperature to between about 100° C. and 150° C., where heating to such temperatures is not injurious to the cured product. Cure temperatures substantially in excess of about 150° C. are generally not desirable but may be employed if desired.

The epoxy resin-anhydride-dialkypyridine combinations described above may be utilized in a wide variety of important applications. For example, because of their low temperature cure properties, they are particularly useful in the preparation of low temperature cure coating compositions and because of their rapid high temperature cures they are useful in the preparation of baking enamels and related compositions. In such applications, it is generally convenient to combine the epoxy resin with the anhydride and dialkylpyridine activator and any desired diluents or other film-forming materials, and then to apply this mixture to the surface to be coated. The coatings may then be allowed to set at the selected curing temperature, for example at between room temperature or about 25° C. and about 150° C.

Our above-described novel systems are also useful in the preparation of potting compounds and castings. They are especially suitable for the preparation of large castings which can be cured throughout, at relatively low temperature. In such applications, the mixture of epoxy resin, anhydride and dialkylpyridine activator, optionally diluted with a suitable solvent is added to the mold or casting form and then allowed to set at a preselected temperature.

Our above-described novel systems are equally useful in the preparation of laminates. In such applications, sheets of fibrous material are first impregnated with a mixture of epoxy resin, anhydride curing agent and dialkylpyridine activator, by spreading a solution of the mixture thereon or by dipping or otherwise immersing, for example, in an acetone solution of the mixture. The solvent is then conveniently removed by evaporation after which the mixture is cured at a predetermined curing temperature to a fusible resin stage. A plurality of the impregnated sheets are then superposed and the assembly is cured in a heated press under a pressure of about 25 to 500 or more pounds pressure per square inch. The resulting infusible laminate is extremely strong and resistant to the action of organic solvents and corrosive agents.

In the above applications, the resulting cured products are characterized by their excellent hardness, durability and good water resistance as well as by lack of discoloration which accompanies many of the other anhydride cured systems.

The following examples are given to describe certain specific embodiments of the invention and illustrate the manner in which the invention may be carried out. The examples employ a typical liquid epoxy resin marketed commercially as "Epon Resin 828" which resin is a polyglycidyl ether of a polyhydric phenol prepared from epichlorhydrin and bisphenol-A having an average molecular weight of between 350 and 400 and an epoxy value of 0.52 epoxide equivalent per 100 grams. It is to be understood however, that the examples are for the purpose of illustration only and are not be interpreted as being limitative of the invention in all details thereof, and the invention is not to be regarded as being restricted to any of the specific materials or conditions recited therein, since changes can be made therein without departing from the scope and spirit of the invention. In the examples the temperatures cited are in degrees centigrade and the parts and percentages are by weight.

EXAMPLE 1

One hundred parts of a typical commercial ethoxylene resin ("Epon Resin 828") where mixed with 70 parts hexahydrophthalic anhydride curing agent and 2.5 parts of a 2,4-dimethylpyridine activator. One portion of the mixture was allowed to cure by standing in a mold at about 25° and a second portion was allowed to cure in a mold at about 80°. Barcol hardness ratings were determined for the resins being cured at room temperature, ratings being taken after 2, 3, 4 and 7 days. The results are represented in Table I. Barcol hardness ratings were also determined for the resins being cured at about 80°, ratings being taken after about 1 hr. at 80° followed by a 10 minute cooling period. The results are represented in Table II. In the table, a Barcol hardness rating designated for example as 65/0 indicates that an original Barcol hardness of 65 is observed which fades to 0, suggesting that the surface of the mold is cured but that the body of the resin is still in fluid form.

EXAMPLES 2–6

The procedure of Example 1 was repeated with the exception that 3,4-dimethylpyridine, 2,5-dimethylpyridine, 3,5-dimethylpyridine, 2-ethyl-4-methylimidazole, and 2,6-dimethylpyridine were substituted, the latter two as comparisons.

Results are shown in the tables below.

TABLE I.—EPOXY RESIN-ANHYDRIDE SYSTEMS CURED AT ABOUT 25°

| Example | Activator | Barcol hardness rating | | | |
|---|---|---|---|---|---|
| | | 2 days | 3 days | 4 days | 7 days |
| 1 | 2,4-dimethylpyridine | 65/0 | 55 | 65 | 62 |
| 2 | 3,4-dimethylpyridine | 55/0 | 65 | 63–65 | 65–67 |
| 3 | 2,5-dimethylpyridine | 48/0 | 60 | 52 | 65 |
| 4 | 3,5-dimethylpyridine | 45/0 | 56 | 66 | 65 |
| 5 | 2-ethyl-4-methylimidazole | 0 | 0 | 0 | 65 |

TABLE II.—EPOXY RESIN-ANHYDRIDE SYSTEMS CURED FOR ONE HOUR AT ABOUT 80°

| Example | Activator | Barcol hardness rating | |
|---|---|---|---|
| | | At 80° | After 10 min. cooling period |
| 1 | 2,4-dimethylpyridine | 79 | 86 |
| 2 | 3,4-dimethylpyridine | 79 | 83 |
| 3 | 2,5-dimethylpyridine | 82 | 86 |
| 4 | 3,5-dimethylpyridine | 80 | 86 |
| 6 | 2,6-dimethylpyridine | 0 | 0 |

We claim:

1. A process for resinifying and curing polyepoxides which comprises reacting an epoxy resin having more than one 1,2-epoxy group per molecule with a polycarboxylic acid anhydride and an activator therefor selected from the group consisting of 2,4-dialkylpyridine, 3,4-dialkylpyridine, 2,5-dialkylpyridine, 3,5-dialkylpyridine and mixtures thereof.

2. A process according to claim 1 wherein said anhydride and said activator are present in amount, respectively, based on the weight of polyepoxide, between about 10 and about 200% and between about 0.2 and about 15%.

3. A process according to claim 2 wherein said polyepoxides are glycidyl polyethers of polyhydric phenols, and each of the alkyl substituents in said activator contains from one to four carbon atoms, the reaction being carried out at a temperature between about 20 and about 120° C.

4. A process according to claim 2 wherein said activator is 2,4-dimethylpyridine.

5. A process according to claim 2 wherein said activator is 3,4-dimethylpyridine.

6. A process according to claim 2 wherein said activator is 2,5-dimethylpyridine.

7. A process according to claim 2 wherein said activator is 3,5-dimethylpyridine.

8. A process according to claim 2 wherein said anhydride is hexahydrophthalic anhydride.

9. A low temperature curable composition which results in cured products having excellent hardness and durability comprising an epoxy resin having more than one 1,2-epoxy group per molecule, a polycarboxylic acid anhydride and an activator therefor selected from the group consisting of 2,4-dialkylpyridine, 3,4-dialkylpyridine, 2,5-dialkylpyridine, 3,5-dialkylpyridine and mixtures thereof.

10. The composition of claim 9 wherein said anhydride and said activator are present in amount, respectively, based on the weight of polyepoxide, between about 10 and about 200% and between about 0.2 and 15%.

11. The composition of claim 10 wherein said anhydride is hexahydrophthalic anhydride and said activator is 2,4-dimethylpyridine.

References Cited

UNITED STATES PATENTS 3,052,650   9/1962   Wear et al.

WILLIAM H. SHORT, *Primary Examiner.*

T. PERTILLA, *Assistant Examiner.*

U.S. Cl. X.R.

117—161; 161—184; 260—2